Figure 1:
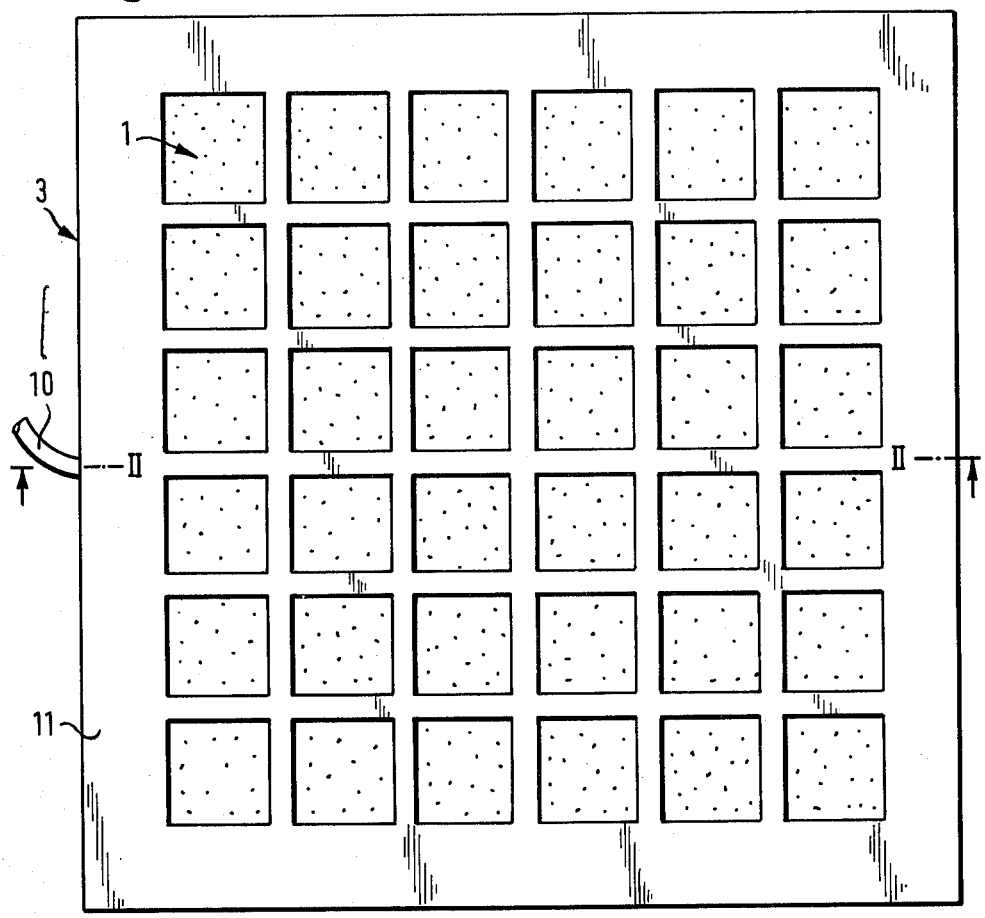

United States Patent [19] [11] 4,037,353
Hennart et al. [45] July 26, 1977

[54] DEVICE FOR EMITTING VAPORS OF ACTIVE SUBSTANCE

[75] Inventors: Claude Hennart, Le Clos Baron a Seraincourt; Marcel Dulat; René Blanc, both of Poitiers, all of France

[73] Assignee: Airwick Industries, Inc., Carlstadt, N.J.

[21] Appl. No.: 726,028

[22] Filed: Sept. 23, 1976

Related U.S. Application Data

[63] Continuation of Ser. No. 634,379, Nov. 24, 1975, abandoned.

[30] Foreign Application Priority Data

Nov. 27, 1974 Luxembourg ............................ 71378

[51] Int. Cl.² .......................................... A01M 19/00
[52] U.S. Cl. ....................................... 43/129; 239/136; 424/219
[58] Field of Search ...................... 43/129, 131; 239/6, 239/56, 60, 136; 424/40, 186, 219

[56] References Cited

U.S. PATENT DOCUMENTS

| 2,808,679 | 10/1957 | Collins | 43/131 |
| 2,882,640 | 4/1959 | Kopecky | 43/129 |
| 3,116,201 | 12/1963 | Whetstone et al. | 424/219 |
| 3,605,321 | 9/1971 | Lazarus | 43/131 |
| 3,630,446 | 12/1971 | Roth et al. | 43/131 X |
| 3,826,036 | 7/1974 | Neugebauer | 43/131 |

FOREIGN PATENT DOCUMENTS 556,003  4/1957  Belgium ............................... 43/129

Primary Examiner—Louis G. Mancene
Assistant Examiner—Daniel J. Leach
Attorney, Agent, or Firm—Karl F. Jorda

[57] ABSTRACT

A device destined for the emission of vapors of an active substance, in particular an insecticidal substance, is described which comprises, in a rigid assembly,
a. a reservoir containing the active substance and having an evaporation surface for the emission of the active vapors, said reservoir comprising
  i. a system of two plates of a porous or fibrous material, one of the large faces of one of the plates facing one of the large faces of the other, and a frame for the plates which separates the space between the two plates from the exterior while leaving entirely or partially free at least one of the two large external faces of the two plates, which can thus serve as an evaporation surface, and
  ii. an insecticidal organo-phosphorus substance having a vapor pressure, at 25° C, of between 5 × 10⁻⁵ and 5 × 10⁻³ mbar, with or without addition of a pyrethrinoid insecticidal compound having a vapor pressure, at 25° C, of between 1 × 10⁻⁶ and 2 × 10⁻⁴ mbar,
b. an electrical resistance associated with the said reservoir in such a way as to heat at least the part of the said reservoir which comprises, or is close to, the said evaporation surface, said resistance being enclosed within the said system and being so constructed as to heat the large internal faces of the two plates to a temperature of up to 85° C, and
c. a system for connecting the resistance to a source of electric current.

17 Claims, 2 Drawing Figures

DEVICE FOR EMITTING VAPORS OF ACTIVE SUBSTANCE

This is a continuation of application Ser. No. 634,379 filed on Nov. 24, 1975, now abandoned.

The present invention relates to a device destined for the emission of vapours of an active substance, in particular an insecticidal substance, which device comprises, in a rigid assembly a. a reservoir containing the active substance and having an evaporation surface for the emission of the active vapours, b. an electrical resistance associated with the said reservoir in such a way as to heat at least the part of the said reservoir which comprises, or is close to, the said evaporation surface, and c. a system for connecting the resistance to a source of electric current.

Such a device has already been described in French Pat. Nos. 981,852, 986,269, 1,092,141, 1,165,348, 1,178,391, 1,384,062, 2,054,435, and 2,175,596 and in Italian Pat. No. 713,459, and comprises the electrical heating of a very small heating surface, so that it is only possible to employ small amounts of active substance which it is necessary to renew frequently and, because of the smallness of the evaporation surface, it is not possible to achieve sufficient evaporation except by increasing the temperature, which causes decomposition of the active substance.

In French Pat. No. 1,384,062 and Italian Pat. No. 713,459, mentioned hereinbefore, attempts have been made to avoid the disadvantages presented by the need frequently to renew the amounts of active substance, by equipping the device with a reservoir which contains the active composition and regularly feeding the heating surface with the active composition. However, this greatly complicates the device, which becomes bulky, expensive and of doubtful reliability It is a main object of the present invention to provide a device which does not suffer from any of the above-mentioned drawbacks. The device should be light, coherent, of little bulk, simple and of low cost; it should contain a plentiful reserve of insecticidal substance, which allows it to function for a long period without requiring recharging; its evaporation surface should be sufficiently large to give good emission of vapours without requiring an excessively high temperature.

Contrary to the known devices such as, for example, that described in Italian Pat. No. 713,459 of Fumakiller Ltd., wherein the heating surface is reduced to a few square centimeters and wherein the operating temperature, in the case of organo-phosphorus insecticides other than DDVP, for example in the case of dibromovinyl dimethyl phosphate, is between 90° and 150° C and normally 130° C, the device according to the present invention has a heating surface which can be as much as several square decimeters, whilst its operating temperature does not exceed 85° C.

The objects of the invention are thus achieved by a device of the type described initially, which is characterised in that the said reservoir comprises i. a system of two plates of porous or fibrous material, one of the large faces of one of the plates facing one of the large faces of the other, and a frame for the plates, which separates the space between the two plates from the exterior whilst leaving entirely or partially free at least one of the two large external faces of the two plates, which can thus serve as an evaporation surface, and ii. an insecticidal organo-phosphorus substance having a vapour pressure, at 25° C, of between $5 \times 10^{-5}$ and $5 \times 10^{-3}$ millibars, with or without addition of a pyrethrintype insecticidal compound having a vapour pressure, at 25° C, of between $1 \times 10^{-6}$ and $2 \times 10^{-4}$ millibars, with which the two plates are impregnated, the total evaporation surface of the two plates being at least 20cm$^2$, the amount of active substance in said reservoir being sufficient to give effective evaporation, at 85° C, for a period of at least 10 hours, and the thickness of the plates being sufficient to absorb the said amount of active substance, and in that the said resistance is enclosed within the said system and is so constructed as to heat the large internal faces of the two plates to a temperature of up to 85° C.

The plates are made of a material capable of absorbing and retaining a desired amount of active substance and must be inert towards the latter. Such a material is, for example, a non-sized cellulose board such as a board made of wood fibre, cereal fibre, esparto fibre, cotton fibre and waste paper, a board made of asbestos, glass fibres or polymeric fibres, a wool felt, a wool and cotton felt, a baked clay tile, sintered alumina, or procelain which has not been subjected to biscuit baking.

The shape of the plates is not critical; it can be round, oval, square, rectangular, triangular or any other polygonal shape; the surface area of one of the sides of a plate is preferably between 20 and 400 cm$^2$, and better still between 40 and 200 cm$^2$; the thickness of each plate depends on the amount of composition, containing the insecticidal substance to be absorbed; it is generally between 0.2 and 6 millimeters and preferably between 0.8 to 5 millimeters.

Preferably, the two plates are placed in parallel and flat, on either side of the electrical resistance, which is of flat shape. For use in a room or hall, it is advantageous if the total volume of the reservoir represented by the two plates is between 4 and 400 cm$^3$.

The material of which the plates consist can also comprise fillers which are inert towards the active substance, such as, for example, silica, barium sulphate, titanium oxide, kaolin and kieselguhr, as well as pigments or dyestuffs.

The electrical resistance is preferably of a size substantially equal to that of the plates of the reservoir; it is produced, for example, by winding a resistance wire around a plate or a frame of a solid electrical insulating material, or by enclosing the said wire in a flexible woven electrical insulating material. Suitable insulating materials are mica, asbestos, porcelain, baked clay and macromolecular substances which are flameproof and inert towards the active substance such as, for example, polytetrafluoroethylene.

The nature, diameter and length of the resistance wire are so chosen as to give the appropriate temperature for the desired level of evaporation of the active substance, taking into account the available voltage. Preferably, this temperature is between 30° and 85° C and, better still, between 45° and 80° C.

Preferably, the electrical power consumed by the resistance is between 0.5 and 10 watts per square decimeter of external surface of the plates of the reservoir. Better still, this power is between 1 and 5 watts.

The electrical resistance can be separated from the plates of the reservoir by an electrical insulation located on either side of the said resistance and consisting, for example, of a varnish, a lacquer, a paint or a sheet of a material chosen from amongst those mentioned as suitable for the support of the resistance.

The connecting system consists of a pin-type plug and/or a cable with conducting wires, such as are known to those skilled in the art of electrical circuits.

To obtain a rigid assembly, which can preferably not be opened, the device according to the invention preferably comprises a system of assembling, or framing its parts, which consists of any suitable means such as seaming, clamping or gluing. It can thus consist of a frame which matches the periphery of the device or of a case of which the faces are perforated so as to allow the insecticidal vapours to pass; this latter device constitutes an assembly which has the advantage of being rigid, solid and attractive and of avoiding any contact of the user's hands with the insecticidal substance. The frame or case can be made of metal or preferably of a synthetic thermoplastic material which is inert towards the insecticidal substance, such as, for example, polyethylene, polypropylene and the polyamides. The pieces of which the frame or the case is made up can be assembled, for example, be gluing, welding or a snap-fit.

The devices according to the invention can be packaged in any leakproof material which is inert towards the active substance and impermeable to moisture, on the one hand, and to the vapours of the active substance, on the other.

It is possible to use metals such as tinplate or aluminium or thermoplastics such as polyamides and polyethylene. According to a preferred version, the packaging material consists of a laminated multi-layer combination which is heat-sealable on one face, of a type known as a "complex" in the packaging field. Such complexes are described, for example, in French Pat. Nos. 1,568,983 and 1,508,871. Numerous complexes are known; the number and nature of their layers can be varied extensively. They may contain, in different sequences, layers of paper, aluminium, polyethylene, polyamide, polyester, copolymers with a high content of vinylidene chloride, oriented polypropylene, a hot-melt resin or an ionomeric resin.

If the system of holding the assembly together consists of a frame or a case, a sheet of complex can be glued or welded onto the latter on each side so as thus to ensure that the assembly is leakproof during storage and transport; the device is then put into operation by simply tearing off or detaching the said sheets.

The composition which is used to impregnate the plates of the device according to the invention is preferably an insecticidal material which consists, for example, of an organo-phosphorus insecticidal compound having a vapour pressure of between $5 \times 10^{-5}$ and $5 \times 10^{-3}$ mbar at 25° C, with or without addition of a pyrethrin-type insecticidal compound having a vapour pressure at 25° C of between $1 \times 10^{-6}$ and $2 \times 10^{-4}$ mbar and, optionally, at least one adjuvant which is inert towards the said compounds and is chosen from amongst diluents, thickeners and stabilisers.

If this insecticidal material consists of a formulation, it preferably contains at least 30% by weight of the organophosphorus compound.

The organophosphorus compounds are chosen from amongst the phosphoric and thiophosphoric esters of which the vapour pressure lies within the region defined above.

These compounds include, for example, the following:

|  |  | Vapour pressure at 25° C, in mbars |
|---|---|---|
| 1) O,O-dimethyl S-4-chlorophenylthiomethyl dithiophosphate | (a) | 0.0039 |
| 2) O-ethyl O-methyl O-2,4,5-trichlorophenyl thiophosphate | (b) | 0.0013 |
| 3) O,O-dimethyl O-2,4,5-trichlorophenyl thiophosphate | (c) | 0.00104 |
| 4) O,O-dimethyl O-3-chloro-4-nitrophenyl thiophosphate | (d) | 0.00065 |
| 5) O,O-dimethyl O-4-bromo-2,5-dichlorophenyl thiophosphate | (e) | 0.00026 |
| 6) O,O-diethyl O-2,4-dichlorophenyl thiophosphate | (f) | 0.00013 |
| 7) O-ethyl O-methyl O-2,2-dichlorovinyl phosphate |  | 0.00091 |
| 8) O-isopropyl O-methyl O-2,2-dichlorovinyl phosphate |  | 0.00078 |
| 9) O-2,2,2-trifluoroethyl O-methyl O-2,2-dichlorovinyl phosphate |  | 0.00039 |
| 10) O-tertiary-butyl O-methyl O-2,2-dichlorovinyl phosphate |  | 0.00039 |
| 11) O-2-chloroethyl O-methyl O-2,2-dichlorovinyl phosphate |  | 0.00039 |
| 12) O-propyl O-methyl O-2,2-dichlorovinyl phosphate |  | 0.00026 |
| 13) O-2-methoxyethyl O-methyl O-2,2-dichlorovinyl phosphate |  | 0.00026 |
| 14) O-isobutyl O-methyl O-2,2-dichlorovinyl phosphate |  | 0.00013 |
| 15) O-sec.-butyl O-methyl O-2,2-dichlorovinyl phosphate |  | 0.000078 |
| 16) O-3-chloropropyl O-methyl O-2,2-dichlorovinyl phosphate |  | 0.000065 |

(a) Compound known by the name of Methylcarbophenothion
(b) Compound known by the name of Trichlorometafos-3
(c) Compound known by the name of Fenchlorphos
(d) Compound known by the name of Chlorthion
(e) Compound known by the name of Bromophos
(f) Compound known by the name of Dichlorfenthion.

The pyrethrin-type compounds are preferably chosen from amongst the insecticidal esters of chrysanthemic acid, in their racemic forms or resolved into the d- and/or l-, cis- and/or trans-forms.

These esters include, for example, the following:

| Vapour pressure at 25° C (Torr) | Compound |
|---|---|
| (1) $2 \times 10^{-6}$ | 3-Crotyl-2-methyl-4-oxo-cyclopent-2-enyl chrysanthemate (a) |
| (2) $2 \times 10^{-6}$ | [5-Allyl-furyl-(3)]-methyl chrysanthemate |
| (3) $2 \times 10^{-6}$ | 4-Allyl-2,6-dimethyl-benzyl chrysanthemate (b) |
| (4) $3 \times 10^{-6}$ | [2,4,5-Trimethyl-furyl-(3)]-methyl chrysanthemate |
| (5) $3 \times 10^{-6}$ | 5-Allyl-furfuryl chrysanthemate |
| (6) $3 \times 10^{-6}$ | 5-Propargyl-furfuryl chrysanthemate (c) |
| (7) $3 \times 10^{-6}$ | 4-Methallyl-benzyl chrysanthemate |
| (8) $4.5 \times 10^{-6}$ | 4-(But-3-enyl)-benzyl chrysanthemate |
| (9) $5 \times 10^{-6}$ | 3-Methallyl-2-methyl-4-oxo-cyclopent-2-enyl chrysanthemate |
| (10) $5 \times 10^{-6}$ | 3-(2-Methyl-prop-2-enyl)-2-methyl-4-oxo-cyclopent-2-enyl chrysanthemate |
| (11) $6 \times 10^{-6}$ | 3-(Pent-2-enyl)-2-methyl-4-oxo-cyclopent-2-enyl chrysanthemate |
| (12) $6 \times 10^{-6}$ | 4-Allyl-benzyl chrysanthemate (d) |
| (13) $6 \times 10^{-6}$ | [2,5-Dimethyl-furyl-(3)]-methyl chrysanthemate |

-continued

| Vapour pressure at 25° C (Torr) | | Compound |
|---|---|---|
| (14) | $7 \times 10^{-6}$ | 4-(2,3-Dichlorophenyl)-but-2-enyl chrysanthemate |
| (15) | $7 \times 10^{-6}$ | 3-(3-Chlorophenyl)-prop-2-ynyl chrysanthemate |
| (16) | $7 \times 10^{-6}$ | 3-Furfuryl-2-methyl-4-oxo-cyclopent-2-enyl chrysanthemate (e) |
| (17) | $9 \times 10^{-6}$ | 4-(2-Methoxyphenyl)-but-2-enyl chrysanthemate |
| (18) | $9 \times 10^{-6}$ | 4-Vinyl-benzyl chrysanthemate |
| (19) | $9 \times 10^{-6}$ | 4,5-Dimethyl-furfuryl chrysanthemate |
| (20) | $1 \times 10^{-5}$ | [2-Methyl-furyl-(3)]-methyl chrysanthemate |
| (21) | $1 \times 10^{-5}$ | 3,5-Dimethyl-furfuryl chrysanthemate |
| (22) | $1 \times 10^{-5}$ | 2,4,6-Trimethyl-benzyl chrysanthemate |
| (23) | $1.5 \times 10^{-5}$ | 2,3-Dimethyl-benzyl chrysanthemate |
| (24) | $1.5 \times 10^{-5}$ | 4-(3-Bromophenyl)-but-w-enyl chrysanthemate |
| (25) | $1.5 \times 10^{-5}$ | 4-(2,3-Dimethylphenyl)-but-2-enyl chrysanthemate |
| (26) | $1.5 \times 10^{-5}$ | 3-Methyl-furfuryl chrysanthemate |
| (27) | $1.5 \times 10^{-5}$ | 5-Methyl-furfuryl chrysanthemate |
| (28) | $1.7 \times 10^{-5}$ | 3-Allyl-2-methyl-4-oxo-cyclopent-2-enyl chrysanthemate (f) |
| (29) | $2 \times 10^{-5}$ | 2,6-Dimethyl-benzyl chrysanthemate |
| (30) | $2 \times 10^{-5}$ | 3,4-Dimethyl-benzyl chrysanthemate (g) |
| (31) | $2 \times 10^{-5}$ | 3,5-Dimethyl-benzyl chrysanthemate |
| (32) | $2 \times 10^{-5}$ | 4-(3-Chlorophenyl)-but-2-enyl chrysanthemate |
| (33) | $2 \times 10^{-5}$ | 2,4-Dimethyl-benzyl chrysanthemate (h) |
| (34) | $2.5 \times 10^{-5}$ | 1-Phenyl-prop-2-ynyl chrysanthemate |
| (35) | $2.5 \times 10^{-5}$ | 4-(2-Methylphenyl)-but-2-enyl chrysanthemate |
| (36) | $2.5 \times 10^{-5}$ | 4-Methyl-benzyl chrysanthemate |
| (37) | $2.5 \times 10^{-5}$ | 2,5-Dimethyl-benzyl chrysanthemate |
| (38) | $2.5 \times 10^{-5}$ | 4-Phenyl-but-2-ynyl chrysanthemate |
| (39) | $3 \times 10^{-5}$ | 3-Methyl-benzyl chrysanthemate |
| (40) | $4 \times 10^{-5}$ | 4-[Thienyl-(2)]-but-2-ynyl chrysanthemate |
| (41) | $4 \times 10^{-5}$ | 4-(2-Chlorophenyl)-but-2-enyl chrysanthemate |
| (42) | $4 \times 10^{-5}$ | 3-(Cyclopent-2-enyl)-2-methyl-4-oxo-cyclopent-2-enyl chrysanthemate (i) |
| (43) | $5 \times 10^{-5}$ | 3-Ethyl-2-methyl-4-oxo-cyclopent-2-enyl chrysanthemate |
| (44) | $5 \times 10^{-5}$ | 1-(3-Fluorophenyl)-prop-2-ynyl chrysanthemate |
| (45) | $5 \times 10^{-5}$ | 1-[Thienyl-(2)]-prop-2-ynyl chrysanthemate |
| (46) | $5 \times 10^{-5}$ | 4-(3-Methylphenyl)-but-2-enyl chrysanthemate |
| (47) | $6 \times 10^{-5}$ | 4-Phenyl-but-2-enyl chrysanthemate |
| (48) | $6 \times 10^{-5}$ | 2-Methyl-benzyl chrysanthemate (j) |
| (49) | $7 \times 10^{-5}$ | 4-[-Furyl-(2)]-but-2-ynyl chrysanthemate |
| (50) | $7 \times 10^{-5}$ | 5-Methyl-hex-5-en-2-ynyl chrysanthemate |
| (51) | $9 \times 10^{-5}$ | 1-(3-Trifluoromethyl-phenyl)-prop-2-ynyl chrysanthemate |
| (52) | $1 \times 10^{-4}$ | 5-Methyl-hexa-2,5-dienyl chrysanthemate |
| (53) | $1 \times 10^{-4}$ | 5,6-Dimethyl-hept-5-en-2-ynyl chrysanthemate |

(a) Compound known by the name of cinerin.
(b) Compound known by the name of DMABC.
(c) Compound known by the name of prothrin or furamethrin.
(d) Compound known by the name of benathrin or ABC.
(e) Compound known by the name of furethrin.
(f) Compound known by the name of allethrin if the ester is formed from a dl/cis-trans acid and a dl alcohol, by the name of bioallethrin if the ester is formed from a d/trans acid and a dl alcohol and by the name of S-bioallethrin if the ester is formed from a d/trans acid and a d alcohol.
(g) Compound known by the name of ENT 21,825.
(h) Compound known by the name of dimethrin if the ester is formed from a dl/cis-trans acid and biodimethrin if the ester is formed from a d/trans acid.
(i) Compound known by the name of cyclethrin.
(j) Compound known by the name of ENT 21,559.

The amount of pyrethrin-type compound in a mixture of the latter with an insecticidal organo-phosphorus compound constitutes up to 25% by weight calculated relative to the weight of the mixture of the insecticidal compounds, that is to say preferably up to 7.5% by weight calculated relative to the total weight of the composition containing the active material.

The inert diluents which can be present in the above-mentioned composition are organic compounds which are inert towards the other constituents of the device and which preferably have a vapour pressure not exceeding that of the organo-phosphorus compound present. Preferably, the inert diluents used act as solvents for the insecticidal compound.

The suitable diluents include, for example, the following compounds:

1. The diesters formed from alkanols and dicarboxylic hydrocarbons such as, for example, dialkyl adipates such as dioctyl adipate and dinonyl adipate, dialkyl sebacates such as dibutyl sebacate, dipentyl sebacate and dioctyl sebacate, dialkyl azelates such as dioctyl azelate, and dialkyl phthalates such as dibutyl phthalate, dioctyl phthalate and didecyl phthalate, di-undecyl phthalate, di-dodecyl phthalate, di-tridecyl phthalate, di-tetradecyl phthalate and dicetyl phthalate.

2. The diesters formed from alkyl-substituted or unsubstituted phenols and dicarboxylic hydrocarbons such as, for example, diaryl phthalates, such as diphenyl phthalate and dicresyl phthalates.

3. The diesters formed from alkyl-substituted or unsubstituted cycloalkanols and dicarboxylic hydrocarbons such as, for example, dicyclohexyl phthalate and the bis-methylcyclohexyl phthalates.

4. The diesters formed from phenylalkanols and dicarboxylic hydrocarbons such as, for example, dibenzyl sebacate.

5. The diesters formed from alkanediols and monocarboxylic hydrocarbons such as, for example, 2,2,4-trimethylpentane-1,3-diol diisobutyrate.

6. The triesters formed from alkyl-substituted or unsubstituted phenols and phosphoric acid, such as, for example, triphenyl phosphate, tris-(4-tertiary butyl-phenyl) phosphate and the tricresyl phosphates.

7. The triesters formed from alkanols and phosphoric acid such as, for example, trioctyl phosphate.

8. The polyalkylene glycols such as, for example, the polyethylene glycols and the polypropylene glycols.

9. The fatty alcohols such as, for example, hexadecanol, octadecanol and octadec-9-enol.

10. The fatty acids such as, for example, lauric, myristic, palmitic, stearic and oleic acid.

11. The alkanes containing at least 18 carbon atoms such as, for example, octadecane, eicosane, docosane and tetracosane, and their mixtures known by the names of vaseline oil, paraffin oil, heavy oil, gas oil, fuel oil, road oil or valve oil, mazout, vaseline, petrolatum, gatsch, paraffin, microwax, ozokerite and ceresin.

12. The alkanones containing at least 18 carbon atoms such as, for example, caprinone, laurone, myristone, palmitone and stearone.

13. The alkenones containing at least eighteen carbon atoms such as, for example, heneicosa-1,20-dien-11-one and oleone.

14. The chlorinated biphenyls and terephenyls such as, for example, the monochlorobiphenyls, the tetrachlorobiphenyls, the hexachlorobiphenyls, perchlorobiphenyl, the pentachloroterphenyls, the nonachloroterphenyls and perchloroterphenyl.

15. The non-volatile halogenoalkanes such as, for example, chlorooctadecane, bromohexadecane, bromooctadecane and chlorinated paraffin waxes.

The composition containing the active substance is liquid or solid at ambient temperature; if it is solid, its liquefaction point preferably does not exceed a temperature of 120° C and, better still, 90° C.

The thickeners are, for example, metal salts of a fatty acid, such as aluminium or magnesium monostearates, distearates and tristearates, or the salts of a fatty acid and an amine, such as hexadecylaminopropylene-amine dioleate, octadecylaminopropylene-amine dioleate and octadecenylaminopropylene-amine dioleate, or the modified montmorillonites, such as the ammonium salts of dimethyl-di-(higher alkyl)-bentonite.

The stabilisers used to stabilise a pyrethrin-type insecticidal compound are preferably chosen from amongst epoxidised compounds, azo compounds and their metallised derivatives, benzodioxoles, phenolic compounds, carboxylic acid anhydrides, sulphur, compounds containing at least one divalent sulphur atom and aromatic amines.

The epoxidised compounds are preferably used in an amount of between 1 and 40% of the weight of the insecticidal substance and are preferably chosen from amongst epoxidised triglycerides such as epoxidised linseed oil, epoxidised poppyseed oil, epoxidised soya oil, epoxidised cottonseed oil, epoxidised groundnut oil, epoxidised wheat oil, epoxidised safflower oil and epoxidised sunflower oil, alkyl epoxystearate, diepoxy-stearates and triepoxy-stearates, such as the butyl, methyl-butyl, ethylbutyl, hexyl, heptyl, octyl, isooctyl and ethylhexyl epoxidised oleates, diepoxidised linoleates and triepoxidised linolenates, and epoxycyclohexyl carboxylate esters, such as bis-(methylepoxycyclohexyl) adipate and epoxycyclohexyl epoxycyclohexane-carboxylate.

Suitable azo compounds are, for example, those quoted in British Pat. No. 1,308,951 filed by the Applicant Company on Mar. 11, 1970 (especially on page 3, line 47 to page 8, line 76 thereof).

Suitable benzodioxoles are, for example, those quoted in French Pat. No. 2,112,069 filed by the Applicant Company on Sept. 11, 1970 (especially on page 3, line 9 to page 11, line 22).

Suitable phenolic compounds possess one or more phenolic groups, and are, for example, 4-tertiary butyl-phenol, the tertiary butyl-cresols, 4-amyl-phenol, 4-octylphenol, 4-nonyl-phenol, the phenylphenols, the phenoxyphenols, alpha-naphthol, beta-naphthol, hydroquinone, resorcinol, pyrocatechol, phloroglucinol, salicyclic acid and its esters, gentisic acid and its esters, gallic acid and its esters, bis-(4-hydroxyphenyl)-methane, 1,1-bis-(4-hydroxyphenyl)ethane, 2,2-bis-(4-hydroxyphenyl)-propane, 1,1,3-tris-(4-hydroxyphenyl)-propane, 1,1,3-tris-(4-hydroxyphenyl)-propane and their halogen derivatives.

Suitable carboxylic anhydrides are, for example, phthalic anhydride, pyromellitic anhydride, succinic anhydride, ethylhexanoic anhydride, octanoic anhydride, decanoic anhydride and lauric anhydride.

Suitable compounds containing at least one divalent sulphur atom are, for example, those quoted in French Pat. No. 2,104,970 filed by the Applicant Company on Sept. 11, 1970.

Suitable aromatic amines are, for example, the N,N-dialkylanilines, the naphthylamines, diphenylamine and triphenylamine.

The benzodioxoles preferred as stabilisers are safrole, isosafrole, 5-cyano-1,3-benzodioxole, 5-ethynyl-1,3-benzodioxole, 5-hydroxymethyl-1,3-benzodioxole, 5-cyanomethyl-1,3-benzodioxole, 5,6-dichloro-1,3,-benzodioxole, 5-chloro-6-cyano-1,3-benzodioxile, 5-bromo-6-cyano, 1,3-benzodioxole, 5-chloro-6-cyanomethyl-1,3-benzodioxole, 5-chloro-6-hydroxy-1,3-benzodioxole, 5-chloro-6-hydroxymethyl-1,3-benzodioxole, 5-chloro-6-hydroxyethyl-1,3-benzodioxole, 5-chloro-6-ethynyl-1,3-benzodioxole and 5-(3-oxo-but-1-enyl)-1,3-benzodioxole.

The amount of the composition, containing the active substance, retained by the plates of the reservoir depends principally on the nature of the plates and, to a lesser extent, on the nature and amount of diluent and/or supplementary material added to the pyrethrin-type active compound. In general terms, the weight of active material is between 0.2 and 2 times that of the plates, and preferably between 0.5 to 1.5 times the weight of the plates.

The impregnation can be carried out by pouring the composition, in the liquid state, over the surface of the plates or steeping the plates in the liquid, the steeping being followed by draining if appropriate; this operation can be mechanised using, for example, a metering pump or a constant-rate set of sprinklers, the amount of liquid deposited depending on the time of exposure of the plates under the set of sprinklers; it is also possible to use a controlled-pressure mangle so as to make it possible to retain the desired proportion of liquid; equally, it is possible to use a controlled-speed centrifuge drainer for the same objective. A method of impregnation which is of value in industrial operation consists, for example, of using long strips which are impregnated continuously and then cut to the desired size.

The impregnation can also be effected by placing the plates under vacuum or excess pressure in the presence of the active material.

The impregnation of the plates can also be effected automatically by a machine comprising an injection syringe and a conveyor belt which causes the plates to be impregnated to travel under this syringe.

To carry out the injection, the needle of the syringe is introduced into the edge of each plate or into the edge of the complete device.

It is also possible to use a solution of the active material in a volatile solvent which is subsequently evaporated.

Figure 2:
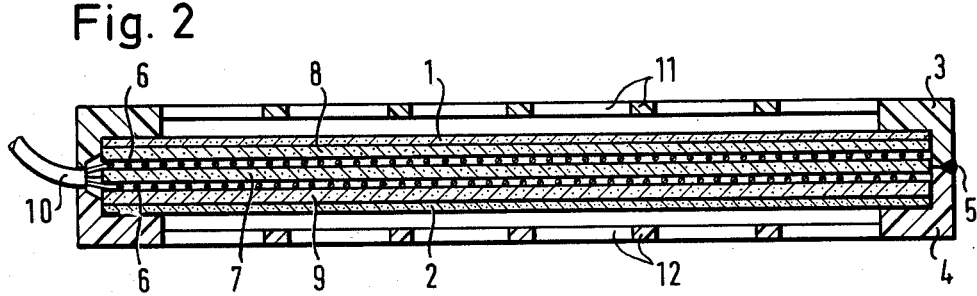

The device according to the present invention will now be described in more detail with reference to the attached drawing, in which:

FIG. 1 is an elevation view of a preferred embodiment of the device according to the invention and FIG. 2 is a cross-section along II—II of FIG. I.

Referring to FIGS. 1 and 2 of the drawing, it is seen that the device illustrated comprises two plates 1 and 2 of fibrous material which constitute the reservoir of the device and can be impregnated with active material.

These plates are clamped in parallel and spaced apart from one another in a polyethylene case consisting of two halves 3 and 4. The two halves are joined by a circular weld 5.

A resistance 6, of a nickel/chromium alloy, in the form of a coil around a mica insulating plate 7, is lodged in the space between the two plates 1 and 2 of the reservoir, and mica insulating plates 8 and 9 are interposed between the resistance coil and the plates 1 and 2 of the reservoir, respectively.

An electrical wire 10 comprising two insulated conductors is connected to the resistance 6. The case 3, 4 is provided with perforated faces 11 and 12, the perforations being in the form of windows.

Some devices according to the invention, and the results which have been obtained with these, are described below by way of examples.

EXPERIMENT 1

Mica plates of 10 centimeters side length and 0.3 millimeter thickness, marketed under the name of "Samianite 41260" and manufactured by Usine de dielectriques de Delle (France) were used. 7.5 meters of a 80:20 nickel-chromium wire 50 microns thick and having a resistivity of 560 ohms per meter are wound around one of these plates, giving a total resistance of 4,200 ohms; the ends of this wire were each connected to a conducting wire ending in a male plug (see FIGS. 1 and 2).

The plate thus prepared was placed between two mica plates identical to the above but without a coil.

Secondly, two square plates of 11 centimeters side length were cut from a sheet of waste paper cardboard manufactured by Societe Francaise Papeteries Pont Audemer; the thickness of each plate was 1.8 millimeters and each weighed 7.9 grams. Each plate was impregnated with 15 grams of the following insecticidal material (representing 30 grams in total): 50% of O,O-dimethyl O-(2,4,5-trichlorophenyl) thiophosphate and 50% of dioctyl phthalate.

The impregnated plates were placed flat on either side on the resistance coil and the edges of the assembly were sealed hermetically by a polyethylene frame in two parts assembled by welding, a passage for the conducting wire having been machined in the frame.

The device thus obtained was placed in a room wherein the temperature was kept at 22° ± 2° C and the relative atmospheric humidity was about 50%.

The plugs of the conducting wire were connected to a 220 volts alternating current source, corresponding to the dissipation of a power of 11.5 watts; an internal temperature of 70° C was noted after 1 hour; the device was weighed regularly so as to know the amounts of organo-phosphorus compound evaporated and the values (mg/day) were recorded.

second day : 290 mg
fourth day : 280 mg
seventh day : 262 mg
14th day : 232 mg
21st day : 210 mg
28th day : 183 mg
35th day : 160 mg
42nd day : 132 mg On the 30th day, a test of the insecticidal efficiency was carried out on house flies released in a room of 26 m³ which was hermetically sealed and kept at a temperature of 25° C; 30 minutes after placing the device in the room, 200 flies were released and 1 hour afterwards the percentage of flies knocked down (KD) was recorded; this percentage was found to amount to 66.7%.

EXPERIMENT 2

The procedure followed was as in Experiment 1, using a resistance of 5,310 ohms, a source of current at 170 volts, representing a power of 5.44 watts, and an insecticidal material consisting of the following: 12.5 grams of O-2-chloroethyl O-methyl O-2,2-dichlorovinyl phosphate and 15 grams of dioctyl phthalate.

An internal temperature of 65° C was noted and the following amounts of organo-phosphorous compound evaporated (mg/day) were recorded:

second day : 340 mg
fourth day : 304 mg
sixth day : 272 mg
eighth day : 245 mg
10th day : 220 mg
12th day : 192 mg
14th day : 178 mg
16th day: 160 mg
18th day : 143 mg On the 18th day, the total amount of organo-phosphorous compound evaporated was about 5 grams; the device was then disconnected and the insecticidal material was extracted in a Soxhlet using acetone; the phosphorus compound still present was measured by gas phase chromatography and was found to be 5.4 grams; the fraction of organo-phosphorus compound decomposed, corresponding to the difference between the amount employed and the sum of the amounts evaporated and remaining, was thus 2.1 grams, representing 16.8%.

EXPERIMENT 3

The procedure followed was as in Experiment 1, using a resistance of 5,260 ohms, a source of current at 160 volts, representing a power of 4.86 watts, and an insecticidal material consisting of the following: 7 grams of O-methyl O-propyl O-2,2-dichlorovinyl phosphate and 9 grams of dioctyl phthalate.

An internal temperature of 63° C was noted and the following amounts of organo-phosphorus compound evaporated (mg/day) were recorded:

second day : 505 mg
fourth day : 410 mg
sixth day : 334 mg
eighth day : 271 mg
10th day : 220 mg
12th day : 179 mg
14th day : 147 mg
16th day : 118 mg
18th day : 98 mg On the 18th day, the total amount of organo-phosphorus compound evaporated was about 5.2 grams; the device was then disconnected and the insecticidal material was extracted in a Soxhlet using acetone; the phosphorus compound still present was measured by gas phase chromatography and was found to be 1.25 grams; the fraction of organo-phosphorus compound decomposed, corresponding to the difference between the amount employed and the sum of the amounts evaporated and remaining, was thus 0.65 gram, representing 9.3%.

EXPERIMENT 4

The procedure followed was as in Experiment 1, using a resistance of 5,440 ohms, a source of current at 160 volts, representing a power of 4.70 watts, and an insecticidal material consisting of the following: 5 grams of O-isobutyl O-methyl O-2,2-dichlorovinyl phosphate and 9 grams of dioctyl phthalate.

An internal temperature of 59° C was noted and the following amounts of organo-phosphorus compound evaporated (mg/day) were recorded:

second day : 561 mg
fourth day : 418 mg
sixth day : 310 mg
eighth day : 229 mg
10th day : 171 mg
12th day : 127 mg
14th day : 93 mg
16th day : 72 mg
18th day : 52 mg On the 18th day, the total amount of organo-phosphorus compound evaporated was about 4.7 grams; the device was then disconnected and the insecticidal material was extracted in a Soxhlet using acetone; the phosphorus compound still present was measured by gas phase chromatography and was found to be 0.2 gram; the fraction of organo-phosphorus compound decomposed, corresponding to the difference between the amount employed and the sum of the amounts evaporated and remaining, was thus 0.1 gram, representing 2%.

EXPERIMENT 5

The procedure of Experiment 1 was followed, using a resistance of 7,120 ohms, a source of current at 170 volts, representing a power of 4.06 watts, two plates of a cellulose/asbestos board 3 millimeters thick, manufactured by Societe Francaise EMACO and each weighing 10.4 grams, and an insecticidal material consisting of 29.4 grams of O-methyl O-propyl O-2,2-dichlorovinyl phosphate, 14.2 grams of 1-chloro-octadecane, 4.9 grams of epoxidised soya oil and 0.5 gram of 1-(4-methyl-2-nitro-phenylazo)-3-ethoxycarbonyl-4,4-dimethyl-2,6-dioxo-cyclohexane.

The insecticidal devices were put into service and insecticidal tests were carried out periodically on house flies released in a room of 28 m³ which was hermetically sealed and kept at a temperature of 25° C. The device was introduced into the room at the same time as the flies and 1 hour afterwards the percentage of flies knocked down (KD) was noted. The values shown below were recorded:
 on the third day : 100%
 on the 17th day : 84%
 on the 24th day : 67%

After 52 days' service, the device was disconnected and the insecticidal material was extracted in a Soxhlet using acetone; the phosphorus compound still present was measured and 5.44 grams of decomposed substance (18.5%) and 6.12 grams of undecomposed available substance were found.

The amount of substance evaporated was 17.84 grams, representing 60.7% of the amount employed.

EXPERIMENT 6

The procedure followed was as in Experiment 5, using a resistance of 8,736 ohms, a source of current at 190 volts, representing a power of 4.13 watts, and in insecticidal material consisting of 29.4 grams of O-isobutyl O-methyl O-2,2-dichlorovinyl phosphate, 14.2 grams of 1-chloro-octadecane, 4.9 grams of epoxidised soya oil and 0.5 gram of 1-(4-methyl-2-nitro-phenylazo)-3-ethoxycarbonyl-4,4-dimethyl-2,6-dioxo-cyclohexane.

The insecticidal devices were put into service and insecticidal tests were carried out periodically, making it possible to record the following KD% after 1 hour:
 on the third day : 95%
 on the 17th day : 74%
 on the 24th day : 72%.

After 52 days, the amount of substance decomposed was 3.75 grams, representing 12.7%, and the amount of undecomposed available substance was 3.15 grams. The amount of substance evaporated was 22.5 grams, representing 76.5% of the amount employed.

EXPERIMENT 7

The procedure followed was as in Experiment 1, using a resistance of 3,400 ohms (representing dissipated power of 14.2 watts) and two square plates of 11 cm side length cut from a cellulose/asbestos board manufactured by the French company EMACO under the reference HP 5; each plate was 3.2 millimeters thick and weighs 10.3 grams. (Internal temperature 80° C).

Each plate was dried and then impregnated with 23 grams of the following composition (making a total of 46 grams): 11% bioallethrin,* 39% of O,O-dimethyl O-2,2-trichlorophenyl thiophosphate and 50% of didecyl phthalate.
* 3-d,1-allyl-2-methyl-4-oxo-cyclopent-2-enyl d-trans chrysanthemate.

Insecticidal tests on mosquitoes (*Culex pipiens*) were carried out periodically, making it possible to record the following KD% at the end of 1 hour:
 on the second day : 95%
 16th day : 100%
 on the 13th day : 100%
 on the 46th day : 91%
 on the 16th day : 92%

EXPERIMENT 8

A device was used which corresponded to that used in Experiment 7; however, the mica plates were of 10 by 20 centimeters size and had the same thickness of 0.3 millimeter, while the cardboard plates were rectangular and had a size of 11 by 21 centimeters; they were cut of the same material having the same thickness, as was used in Experiment 7; a resistance of 2450 ohms and a source of electrical current at 160 volts representing a power of 19.8 watts and producing, in operation, an internal temperature of 62° C were employed.

The cardboard plates were impregnated with a total of 84 grams of an insecticidal composition consisting in percent by weight of
 50% O-(2-methoxycarbonyl-prop-1-enyl-O,O-dimethyl thiophosphate
 10% epoxized soybean oil
 0.5% 1-(4-phenylazo-phenylazo)-2-ethylamino-naphthalene
 19.5% octyl adipate
 20% vaseline oil.

On the eighth day of service an insecticidal efficacy test was carried out on mosquitoes (Culex pipiens) which showed a KD-% value of 100% in less than 1 hour; on the 49th day of service, that value was still at 95.7% in less than 1 hour.

EXPERIMENT 9

A device corresponding to that used in Experiment 7 was employed; however, resistance therein was 4900 ohms, the power 9.9 watts and the internal temperature 62° C, all other data being the same as in Experiment 7.

The insecticidal composition which was used for impregnation of the cardboard plates in the same amount as in Example 7 consisted of the following (in percent by weight):
 47% O-(2-methoxycarbonyl-prop-1-enyl)-O,O-dimethyl thiophosphate
 3% S-Bioallethrin *
 0.5% 1-(4-phenylazo-phenylazo)-2-ethylamino-naphthalene
 19.5% octyl adipate
 20% vaseline oil.
* 3-d-allyl-2-methyl-4-oxo-cyclopent-2-enyl d-trans chrysanthemate Insecticidal tests on mosquitoes (*Culex pipiens*) were carried out periodically, making it possible to record the following KD% at the end of 1 hour:
 on the 8th day : 100%
 on the 22th day : 100%
 on the 34th day : 99%
 on the 49th day : 93.4%
 on the 63th day : 85.1%
 on the 76th day : 85.9%

The instability of insecticidal phosphoric acid esters has been mentioned in the following publications:

a. German Pat. No. 2,347,660 of Imperial Chemical Industries
b. German Pat. No. 2,411,764 of Sandoz S.A.

Some examples of devices according to the invention are given below in order to illustrate the invention without limiting it.

| Insecticidal material Insecticidal Compound | Examples 1 to 12 | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Carbophenothion methyl | 40 | — | — | — | — | — | — | — | — | — | — | — |
| Trichlormetafos-3 | — | 45 | — | — | — | — | — | — | — | — | — | — |
| Fenchlorphos | — | — | 65 | — | — | — | 40 | — | — | — | — | — |
| Chlorthion | — | — | — | 55 | — | — | — | — | — | — | — | — |
| Bromophos | — | — | — | — | 70 | — | — | — | — | — | — | — |
| Dichlorfenthion | — | — | — | — | — | 80 | 40 | — | — | — | — | — |
| Compound I | — | — | — | — | — | — | — | 45 | 60 | — | — | — |
| Compound II | — | — | — | — | — | — | — | — | — | 30 | — | — |
| Compound III | — | — | — | — | — | — | — | — | — | — | 40 | 50 |
| Adjuvant | | | | | | | | | | | | |
| Dibutyl phthalate | — | — | — | — | — | — | — | 30 | — | — | — | — |
| Dioctyl phthalate | — | — | — | 30 | — | — | — | — | — | — | — | — |
| Butyl stearate | 39 | — | — | — | — | — | — | — | — | — | — | — |
| Tricresyl phosphate | — | — | — | — | — | — | 20 | — | — | — | — | — |
| Dioctyl adipate | — | 33 | — | — | 15 | — | — | — | — | — | — | — |
| 1-Chloro-octadecane | — | — | — | 15 | 15 | — | — | 24 | — | — | 54 | — |
| Vaseline oil | 20 | 20 | 15 | — | — | — | — | — | 26 | 50 | — | 30 |
| Laurone | — | — | — | — | — | — | — | — | 12 | 19 | — | — |
| Stearone | — | — | 15 | — | — | — | — | — | — | — | — | 15 |
| Aluminium tristearate | — | 2 | — | — | — | — | — | — | — | — | 3 | — |
| Cyclohexyl epoxystearate | 1 | — | 5 | — | — | 20 | — | — | — | — | — | 3 |
| 1-Phenylazo-naphth-2-ol | — | — | — | — | — | — | — | 1 | — | — | — | — |
| Piperonyl butoxide (h) | — | — | — | — | — | — | — | — | 2 | — | — | — |
| bis-(4-Hydroxyphenyl)-methane | — | — | — | — | — | — | — | — | — | 1 | — | — |
| Phthalic anhydride | — | — | — | — | — | — | — | — | — | — | 2 | — |
| Sulphur | — | — | — | — | — | — | — | — | — | — | 1 | — |
| Zinc salt of 2-mercaptobenzothiazole | — | — | — | — | — | — | — | — | — | — | — | 2 |
| Preparation temperature (° C) | 80 | 85 | 95 | 70 | 80 | 20 | 70 | 25 | 85 | 90 | 35 | 95 |
| Weight used in grams | 2.5 | 7.2 | 17 | 22 | 50 | 86 | 94 | 78 | 24 | 22 | 58 | 65 |
| Reservoir | | | | | | | | | | | | |
| External surface area of one face (dm²) | 0.2 | 0.4 | 0.8 | 1 | 1 | 2 | 4 | 2 | 2 | 1 | 1 | 0.6 |
| Thickness of one plate (mm) | 1 | 1.5 | 2 | 2 | 3 | 4 | 5 | 6 | 1 | 2 | 3 | 4 |
| Total volume (cm³) | 4 | 12 | 32 | 40 | 60 | 160 | 400 | 240 | 40 | 40 | 60 | 48 |
| Nature of the plates | (n) | (o) | (l) | (l) | (i) | (j) | (m) | (k) | (n) | (l) | (i) | (j) |
| Resistance | | | | | | | | | | | | |
| Magnitude, in thousands of ohms | 60.5 | 15.1 | 4.5 | 3.6 | 14.4 | 3.3 | 0.6 | 4 | 2.4 | 9.7 | 12.1 | 20.2 |
| Potential provided in volts | 110 | 110 | 120 | 120 | 240 | 230 | 220 | 220 | 220 | 220 | 220 | 110 |
| Power (watts/dm²) | 0.5 | 1 | 2 | 2 | 2 | 4 | 10 | 3 | 5 | 2.5 | 2 | 0.5 |
| Insulating material | (p) | (q) | (r) | (r) | (i) | (i) | (r) | (i) | (p) | (r) | (i) | (i) |

Compound I : 0-2,2,2-trifluoroethyl O-methyl 0-2,2-dichlorovinyl phosphate
Compound II : 0-2-chloroethyl O-methyl 0-2,2-dichlorovinyl phosphate
Compound III : O-isobutyl O-methyl 0-2,2-dichlorovinyl phosphate
(h) Common name of 5-propyl-6-(2,5,8-trioxa-dodecyl)-1,3-benzodioxiole
(i) Asbestos fibre plates weighing 16 g/dm²
(j) Baked clay plates weighing 108 g/dm²
(k) Wood fibre plates weighing 24.2 g/dm²
(l) Waste paper board plates weighing 7.2 g/dm²
(m) Linen fibre board plates weighing 19.3 g/dm²
(n) Polyethylene and cotton fibre plates weighing 3.1 g/dm²
(o) Cellulose and asbestos fibre board plates weighing 4.5 g/dm²
(p) Polytetrafluoroethylene plate 1.5 millimeters thick
(q) Porcelain plate one millimeter thick
(r) Mica plate 0.3 millimeter thick.

We claim:
1. A device destined for the emission of active vapours of an active substance, in particular an insecticidal substance, which comprises, in a rigid assembly,
   a. a reservoir containing the active substance and having an evaporation surface for the emission of the active vapours, said reservoir comprising
      i. a system of two plates of a porous or fibrous material, one of the large faces of one of the plates facing one of the large faces of the other, and a frame for the plates, which separates the space between the two plates from the exterior whilst leaving entirely or partially free at least one of the two large external faces of the two plates, which can thus serve as an evaporation surface, and
      ii. an insecticidal organo-phosphorus substance having a vapour pressure, at 25° C, of between $5 \times 10^{-5}$ and $5 \times 10^{-3}$ mbar, with or without addition of a pyrethrinoid insecticidal compound having a vapour pressure, at 25° C, of between $1 \times 10^{-6}$ and $2 \times 10^{-4}$ mbar, said two plates being impregnated, with said substance or substances, the total evaporation surface of the two plates being at least 20 cm², the amount of active substance in said reservoir being sufficient to give effective evaporation, at 85° C for a period of at least 10 hours, and the thickness of the plates being sufficient to absorb the said amount of active substance,
   b. an electrical resistance associated with the said reservoir in such a way as to heat at least the part of the said reservoir which comprises, or is close to, the said evaporation surface, said resistance being enclosed within the said system and being so constructed as to heat the large internal faces of the two plates to a temperature of up to 85° C, and c. a system for connecting the resistance to a source of electric current.

2. A device as described in claim 1, wherein the two plates are placed in parallel, and flat, on either side of the electrical resistance.

3. A device as described in claim 1, wherein the resistance consists of a resistance wire wound around a plate of a solid electrical insulating material.

4. A device as described in claim 1, wherein the electrical resistance is of a size substantially equal to that of the plates constituting the reservoir, and is separated from the plates constituting the reservoir by a means of electrical insulation.

5. A device as described in claim 4, wherein the electrical insulation is a coating chosen from amongst lacquers, paints and varnishes which are non-conductors of electricity and are inert towards the active material.

6. A device as described in claim 4, wherein the electrical insulation consists of two plates of solid electrical insulating material placed either side of the resistance, and is of a material selected from mica, asbestos and polytetrafluoroethylene.

7. A device as described in claim 1, wherein the plates which constitute the reservoir are made from at least one of the following materials: non-sized cellulose boards, boards containing asbestos, glass fibre boards, polymeric fibre boards, wool, a mixture of wool and cotton, felts, baked clay tiles, sintered alumina and porcelains which have not been subjected to biscuit baking.

8. A device as described in claim 1 wherein said frame is in the form of a case which surrounds the two plates constituting the reservoir and of which the faces superposed over the external faces of the two faces are perforated.

9. A device as described in claim 1 wherein the said frame is made of solid polyethylene, solid polypropylene or solid polyamide.

10. A device as described in claim 1, wherein the volume of the reservoir is between 4 and 400 $cm^3$.

11. A device as described in claim 10, wherein the surface of one of the sides of a plate is between 20 and 400 $cm^2$.

12. A device as described in claim 11, wherein the evaporation surface area of one of the large faces of a plate is between 40 and 200 $cm^2$, and the thickness of a plate is between 0.2 and 6 millimeters.

13. A device as described in claim 12, wherein the resistance is such as to absorb a power of between 0.5 and 10 watts per square decimeter of external surface of the plates constituting the reservoir.

14. A device as described in claim 10, wherein the plates of the reservoir are impregnated with 0.2 to 2 times their weight of a composition which contains at least 5%, calculated relative to the weight of the said composition, of an insecticidal substance having a vapour pressure in the defined range.

15. A device as described in claim 14, wherein the said composition contains an adjuvant which is inert towards the organo-phosphorus and pyrethrinoid insecticidal compounds and is chosen from amongst diluents, thickeners, stabilisers, perfumes and dyestuffs.

16. A device as described in claim 14, wherein the said composition has a melting point not exceeding about 120° C.

17. A device as described in claim 14, wherein the weight of the said composition contained in the reservoir is between 0.5 and 1.5 times the weight of the plates of the said reservoir.

* * * * *